No. 863,272. PATENTED AUG. 13, 1907.
V. GEBHARDT.
FISH HOOK.
APPLICATION FILED FEB. 4, 1907.
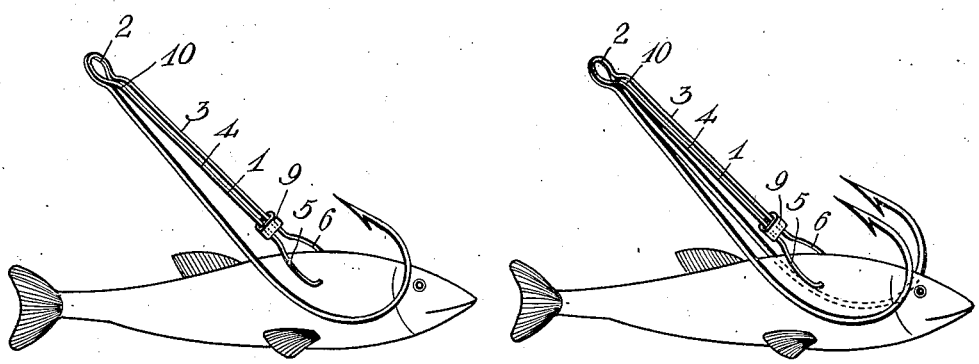
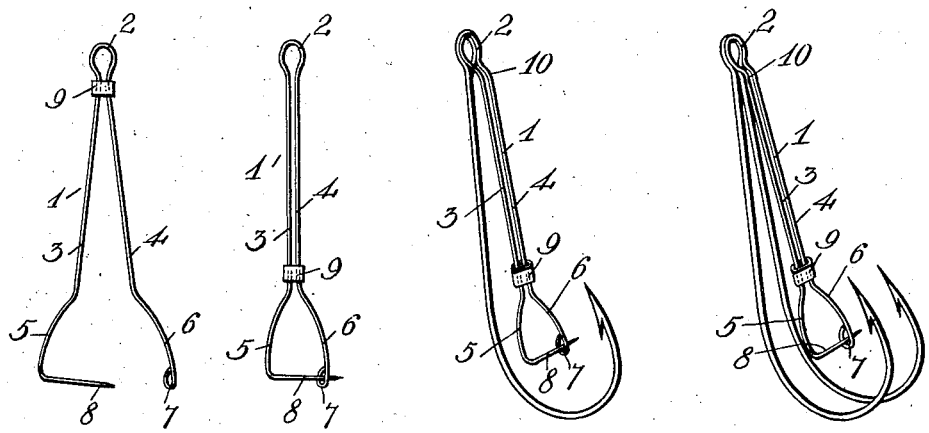
Witnesses
Inventor
Victor Gebhardt
by Attorneys

UNITED STATES PATENT OFFICE.

VICTOR GEBHARDT, OF ST. LOUIS, MISSOURI.

FISH-HOOK.

No. 863,272.  Specification of Letters Patent.  Patented Aug. 13, 1907.

Application filed February 4, 1907. Serial No. 355,640.

*To all whom it may concern:*

Be it known that I, VICTOR GEBHARDT, a citizen of the United States, residing at St. Louis, in the county of St. Louis City and State of Missouri, have invented certain new and useful Improvements in Fish-Hooks; and I do declare the following to be a full, clear, and exact description of the invention, such as will enable others skilled in the art to which it appertains to make and use the same.

My invention is an improved bait holder for fish hooks, and is an improvement upon the bait holders of my inventions for which Letters-Patent of the United States were granted to me as follows: No. 699,304, dated May 6, 1902; No. 740,416, dated October 6, 1903, and No. 794,352, dated July 11, 1905.

One object of my present improvements is to simplify the construction of the arms of the bait holder, and another object is to provide improved means for locking the said arms when the bait has been attached, as hereinafter more specifically described and claimed.

In the accompanying drawings,—Figure 1 is a perspective view of my improved bait holder, in connection with a single hook, and showing the bait holder attached to live bait; Fig. 2 is a similar view showing my improved bait holder attached to a double hook and to a live bait; Fig. 3 is a detail front elevation of my improved bait holder, showing the same open; Fig. 4 is a similar view, showing the same closed; Fig. 5 is a perspective view of my improved bait holder attached to a single hook; and Fig. 6 is a similar view, showing the same attached to a double hook.

In accordance with my present invention, I provide a bait holder 1, which is made from a single piece of suitable spring wire. The wire is doubled and bent to form an open eye 2, which corresponds in size and shape with the eye of the hook to which it is adapted to be attached. A pair of arms 3, 4, which are straight for the greater portion of their length extend from the said open eye. Said arms have their outer portions curved outwardly in opposite directions, as at 5, 6, an eye 7 is formed at the outer end of the curved portion 6 of the arm 4, and a transversely-disposed point 8, is bent from the outer end of the curved portion 5 of the arm 3, is adapted to be pressed through the body of the bait and to be engaged with the eye 7 when the arms 3, 4, are pressed toward each other, as will be understood. The said bait holder, by the inherent resiliency of the wire from which it is made, normally causes the arms 3, 4, to spring apart, as shown in Fig. 3. To secure the said arms in parallel position, and with the point 8 engaged with the eye 7 after said point has been passed through the bait, I provide a keeper 9, which is a loop or link, preferably of substantially elliptical form, through which the straight portions of the arms 3, 4, pass, and of such length as to permit said arms to spring apart when said keeper is near the eye, as shown in Fig. 3, and to move said arms toward each other and secure them in parallel position with respect to each other when said keeper is moved downwardly on said arms to the outwardly-curved portions 5, 6, thereof, as shown in Fig. 4. It will be observed by reference to the drawings that the inner portions of the said arms 3, 4, where they join the eye 2, are bent outwardly from said eye, as at 10, to cause the said arms to clear the shank or shanks of the single or double hook. The eye 2 of the bait holder which, as hereinbefore stated, is of the same size and shape as that of the hook is in practice united to the eye of the hook, as by soldering or brazing. It may be otherwise secured to the hook, within the scope of my invention, and I do not limit myself in this particular.

It will be observed by reference to the drawings, that my improved bait holder obviates the necessity of passing the hook through the body of the bait and when used with live bait inflicts practically no injury thereto and serves to keep the bait close to the hook, or between the two hooks when used on a double hook, presents the bait to the fish head first, lively and active, enables the bait to be detached and re-attached at the pleasure of the angler with least possible injury to the bait, and keeps the bait in such position with reference to the hook that a fish in endeavoring to swallow the bait will bring his jaw squarely down on the point of the hook and thus effectively impale himself.

From the foregoing description, taken in connection with the accompanying drawings, the construction and operation of the invention will be readily understood without requiring a more extended explanation.

Various changes in the form, proportion, and the minor details of construction, may be resorted to without departing from the principle or sacrificing any of the advantages of the invention, as defined by the appended claims.

Having thus described my invention, what I claim as new, and desire to secure by Letters-Patent, is,—

1. A bait holder for attachment to a fish hook having a pair of arms normally sprung apart, one provided with an eye and the other with a transversely-extending point to pass through the body of the bait and enter said eye, and means to secure said arms together to keep said point in said eye.

2. A bait holder for attachment to a fish hook having a pair of arms normally sprung apart, one provided with an eye and the other with a transversely-extending point to pass through the body of the bait and enter said eye, and a keeper slidable longitudinally on said arms to lock and release them.

3. A bait holder for attachment to a fish hook comprising an open eye for attachment to the eye of the hook, a pair of arms extending from the open side of the eye, normally sprung apart, and each provided at its outer end with an outwardly-curved portion, one of said curved portions having an eye and the other having a transversely-disposed point to pass through the bait and enter said eye, and a keeper slidable on said arms to lock or release them.

4. A fish hook having a bait holder attached thereto and disposed at one side of its shank, said bait holder comprising a pair of arms, normally sprung apart, one having a transversely-disposed point and the other having a device to engage said point, and means to secure the arms together or release them and permit them to spring apart at will.

In testimony whereof I have hereunto set my hand in presence of two subscribing witnesses.

VICTOR GEBHARDT.

Witnesses:
 CHAS. A. HOFFMANN,
 GUS G. SCHLAPPRIZZI.